(12) United States Patent
Gunasekara et al.

(10) Patent No.: US 8,170,036 B1
(45) Date of Patent: May 1, 2012

(54) SYSTEMS AND METHODS OF VOICE CHAT

(75) Inventors: Don Gunasekara, Reston, VA (US);
Tom Wilson, Overland Park, KS (US)

(73) Assignee: Nextel Communications, Inc., Reston, VA (US)

( * ) Notice: Subject to any disclaimer, the term of this patent is extended or adjusted under 35 U.S.C. 154(b) by 1022 days.

(21) Appl. No.: 12/118,908

(22) Filed: May 12, 2008

(51) Int. Cl.
*H04L 12/28* (2006.01)
*H04L 12/64* (2006.01)

(52) U.S. Cl. ........ 370/401; 370/352; 370/465; 370/477; 709/206

(58) Field of Classification Search .................. 370/329, 370/338, 352, 401, 465–477; 709/206, 207
See application file for complete search history.

(56) References Cited

U.S. PATENT DOCUMENTS

| | | | |
|---|---|---|---|
| 6,788,667 B1* | 9/2004 | Beresin | 370/338 |
| 6,915,138 B2* | 7/2005 | Kraft | 455/466 |
| 6,996,520 B2* | 2/2006 | Levin | 704/10 |
| 2005/0128981 A1* | 6/2005 | Creamer et al. | 370/332 |
| 2007/0159973 A1* | 7/2007 | Altberg et al. | 370/230 |
| 2007/0162553 A1* | 7/2007 | Dewing et al. | 709/207 |
| 2007/0282959 A1* | 12/2007 | Stern | 709/206 |
| 2008/0139228 A1* | 6/2008 | Raffel et al. | 455/466 |
| 2008/0268813 A1* | 10/2008 | Maes | 455/406 |

* cited by examiner

*Primary Examiner* — Chi Pham
*Assistant Examiner* — Ahmed Elallam

(57) ABSTRACT

Systems and methods of exchanging voice chat information are provided. Voice chat information is received and the received voice chat information is placed into one or more packets. A control channel is selected and the one or more packets are transmitted over the selected control channel. The voice chat information can be transmitted in short messaging service (SMS) packets over the control channel. Moreover, voice chat information is exchanged between first and second communication stations by way of a SMS gateway, and media and signaling information are exchanged between the first and second communication stations independent on the SMS gateway.

10 Claims, 7 Drawing Sheets

SYSTEMS AND METHODS OF VOICE CHAT

BACKGROUND OF THE INVENTION

Wireless and wired communications are typically performed in accordance with one or more standards. These standards define a number of different aspects of the communications. For example, wireless communication standards typically define a number of different channels, such as control channels and traffic channels. The control channels carry control information (such as call-related signaling), which is distinct from user data carried in the traffic channels. Some wireless networks provide different traffic channels for different type of user data, where each traffic channel is optimized for the particular type of user data carried within the channel. For example, a wireless communication system can employ one type of traffic channel for voice user data and another traffic channel for non-voice user data. Some wireless communication systems also provide for different types of non-voice user data channels, such as channels for low-rate non-voice user data and high-rate user data. Once these channels are defined, standards-compliant communication devices must use these channels in the manner defined in the standard.

SUMMARY OF THE INVENTION

Exemplary embodiments of the present invention are directed to systems and methods of exchanging voice chat information. Voice chat information is received and placed into one or more packets. A control channel is selected and the one or more packets are transmitted over the selected control channel. The voice chat information can be transmitted in short messaging service (SMS) packets over the control channel.

Exemplary embodiments of the present invention are also directed to systems and methods of communicating between a first and second communication station. Voice chat information is exchanged between the first and second communication stations by way of a short messaging service (SMS) gateway. Media and signaling information are exchanged between the first and second communication stations independent of the SMS gateway.

An exemplary system includes a short message service (SMS) gateway coupled to a switching center of a wireless communication network, and an Internet gateway coupled to the SMS gateway. A voice chat server is coupled to the Internet gateway, and the SMS gateway provides voice chat packets to the voice chat server via the Internet gateway.

Other objects, advantages and novel features of the present invention will become apparent from the following detailed description of the invention when considered in conjunction with the accompanying drawings.

BRIEF DESCRIPTION OF THE DRAWING FIGURES

DETAILED DESCRIPTION OF THE PREFERRED EMBODIMENTS

Figure 1:
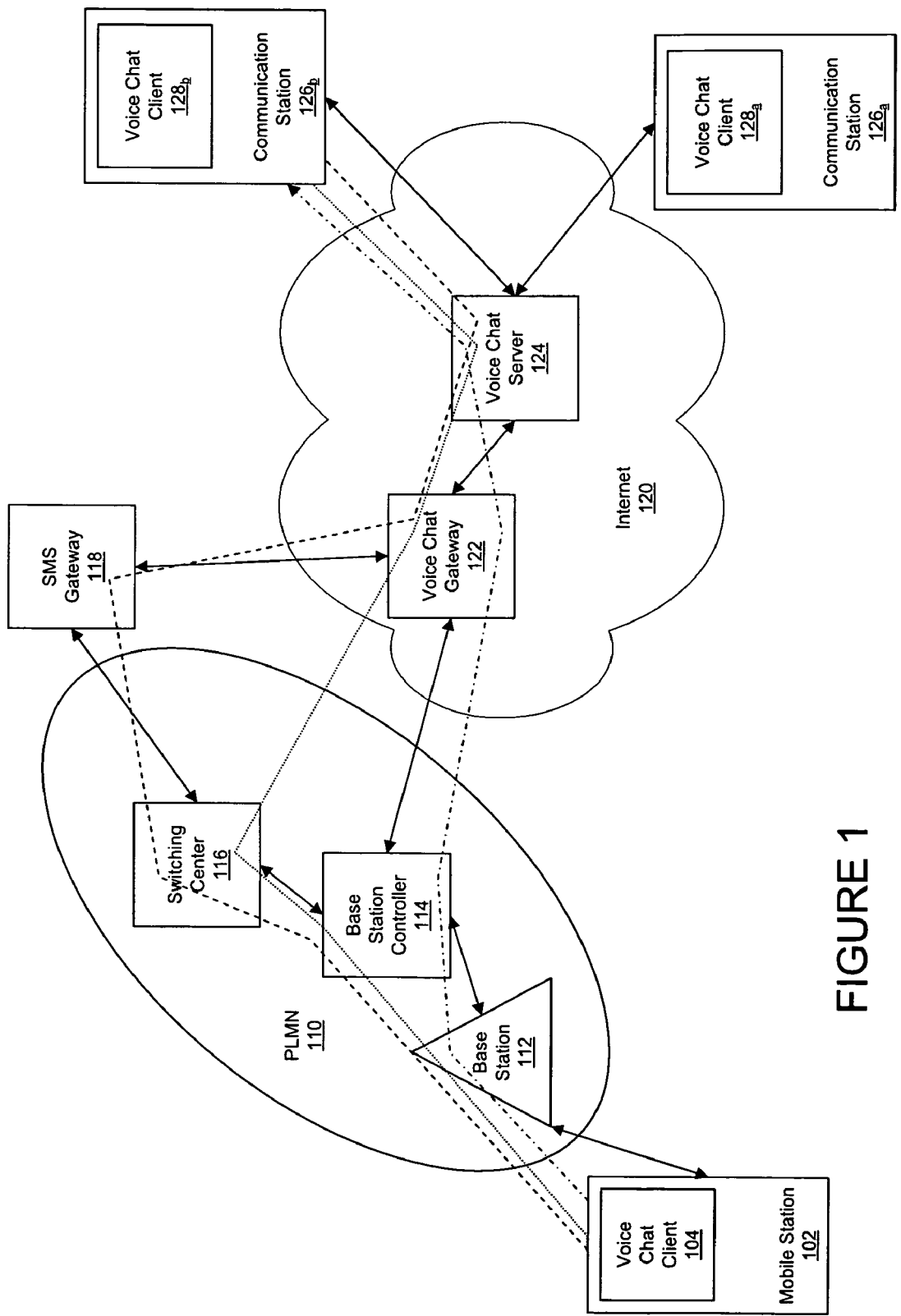
FIG. 1 is a block diagram of an exemplary system in accordance with the present invention.

FIG. 1 is a block diagram of an exemplary system in accordance with the present invention. The system of FIG. 1 allows a mobile station 102 to participate in a voice chat session with one or more communication stations $126_a$ and $126_b$ using short message service (SMS) packets to carry the voice chat information via public land mobile network (PLMN) 110 to Internet 120. In FIG. 1 the dashed line indicates the path of the voice packets, the dotted line indicates the path of the signaling and the dash-dotted line indicates the path of media (voice and/or data) other than voice chat media.

As illustrated in FIG. 1, voice chat client 104 of mobile station 102 provides the voice chat information in SMS packets to base station 112. The voice chat packets then follow a path that includes base station controller (BSC) 114, switching center 116, SMS gateway 118, an Internet gateway (voice chat gateway 122) and voice chat server 124. Voice chat server 124 then provides the voice chat packets to the particular end communication station $126_a$ and/or $126_b$. As also illustrated in FIG. 1, the signaling packets follow a path that includes base station 112, base station controller 114, switching center 116, voice chat gateway 122 and voice chat server 124. Voice chat server 124 can then forward the signaling packets to the particular end communication station $126_a$ and/or $126_b$. The media packets follow a similar path to that of the signaling packets except that the media packets are routed from base station controller 114 to voice chat gateway 122 without passing through switching center 116. Accordingly, as illustrated in FIG. 1, the voice chat information is exchanged between the source and destination endpoints by way of SMS gateway 118, whereas the signaling and other media information are exchanged independent of SMS gateway 118.

Figure 2:
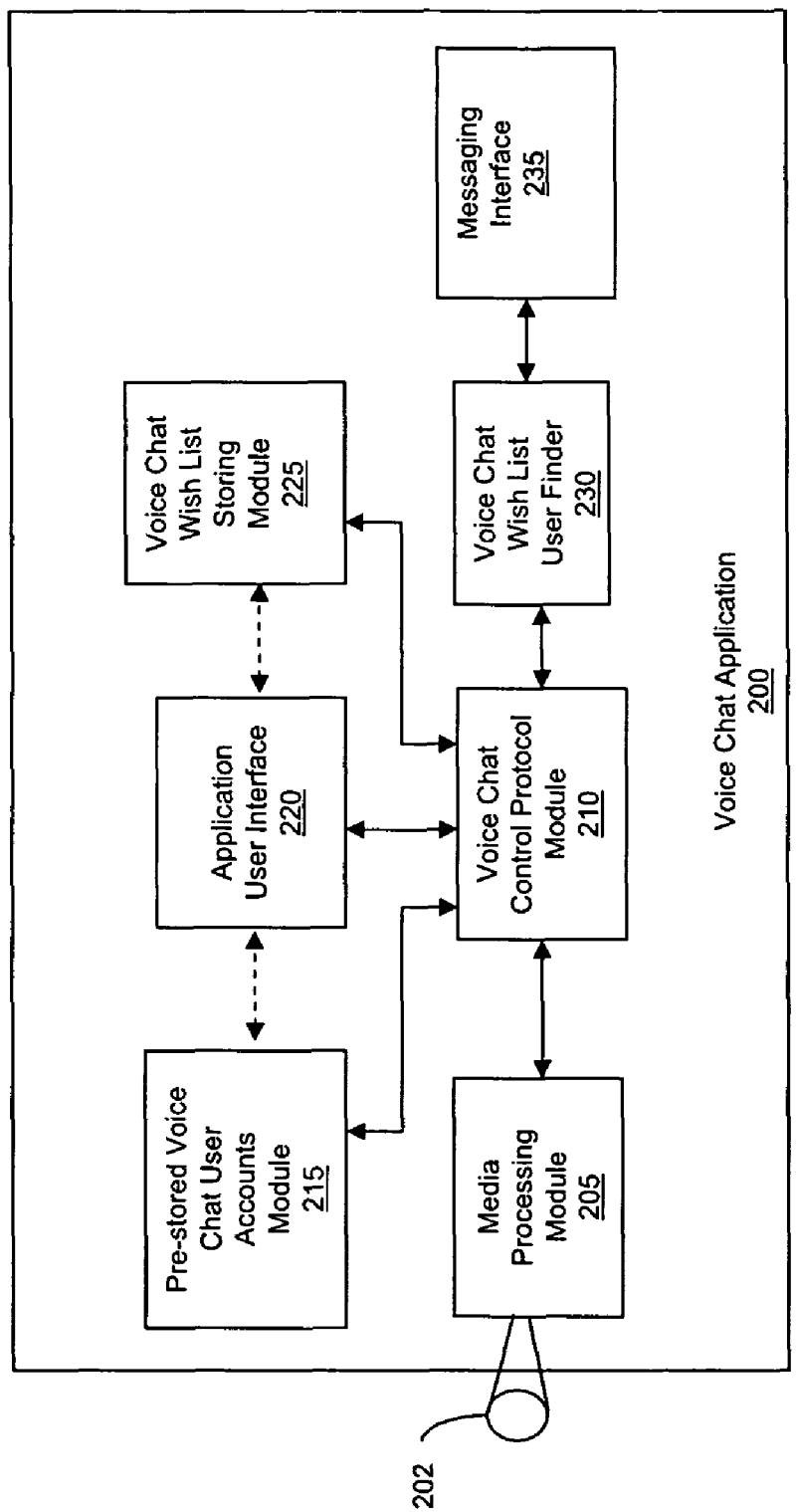
FIG. 2 is a block diagram of an exemplary voice chat client application in accordance with the present invention.

FIG. 2 is a block diagram of an exemplary voice chat client application in accordance with the present invention. Voice chat client application 200 can be software executed on a processor of a wireless communication device and/or can be embodied in an application specific integrated circuit (ASIC). Voice chat application 200 includes element 202 which can be a speaker and/or microphone for receiving and outputting voice chat information with media processing module 205. Media processing module 205 processes voice chat information received from element 202 and outputs voice chat information received from another endpoint via element 202. Media processing module 205 is coupled to voice chat protocol module 210, which establishes, maintains and clears the chat session. Voice chat control protocol module 210 is coupled to pre-stored voice chat user accounts module 215, which can store voice chat user account credentials for one or more user accounts. Application user interface provides an output to a display of the wireless communication device. For example, when the user is registered with the network and in an active state, a corresponding entry in the list of voice chat user accounts can be highlighted in a list output by application user interface 220.

As will be described in more detail below, exemplary embodiments of the present invention provide a wish list feature allowing a voice chat caller to be notified when second voice chat participant, who is not currently available (e.g., either involved in another media session or not registered with the network), becomes available. Modules 225 and 230 support this wish list feature. Specifically, voice chat control protocol module 210 is coupled to voice chat wish list storing module 225, which allows a user to set a notification of called party's availability. Module 210 is also coupled to voice chat wish list user finder 230 which employs a filter to identify SMS messages related to wish list notifications received from voice chat gateway 122. Thus, when module 230 identifies such SMS messages, the user of the communication station can be notified of another user's availability. Messaging interface 235 is coupled to voice chat wish list finder 230, and acts as an interface between voice chat application 200 and the network.

Figure 3:
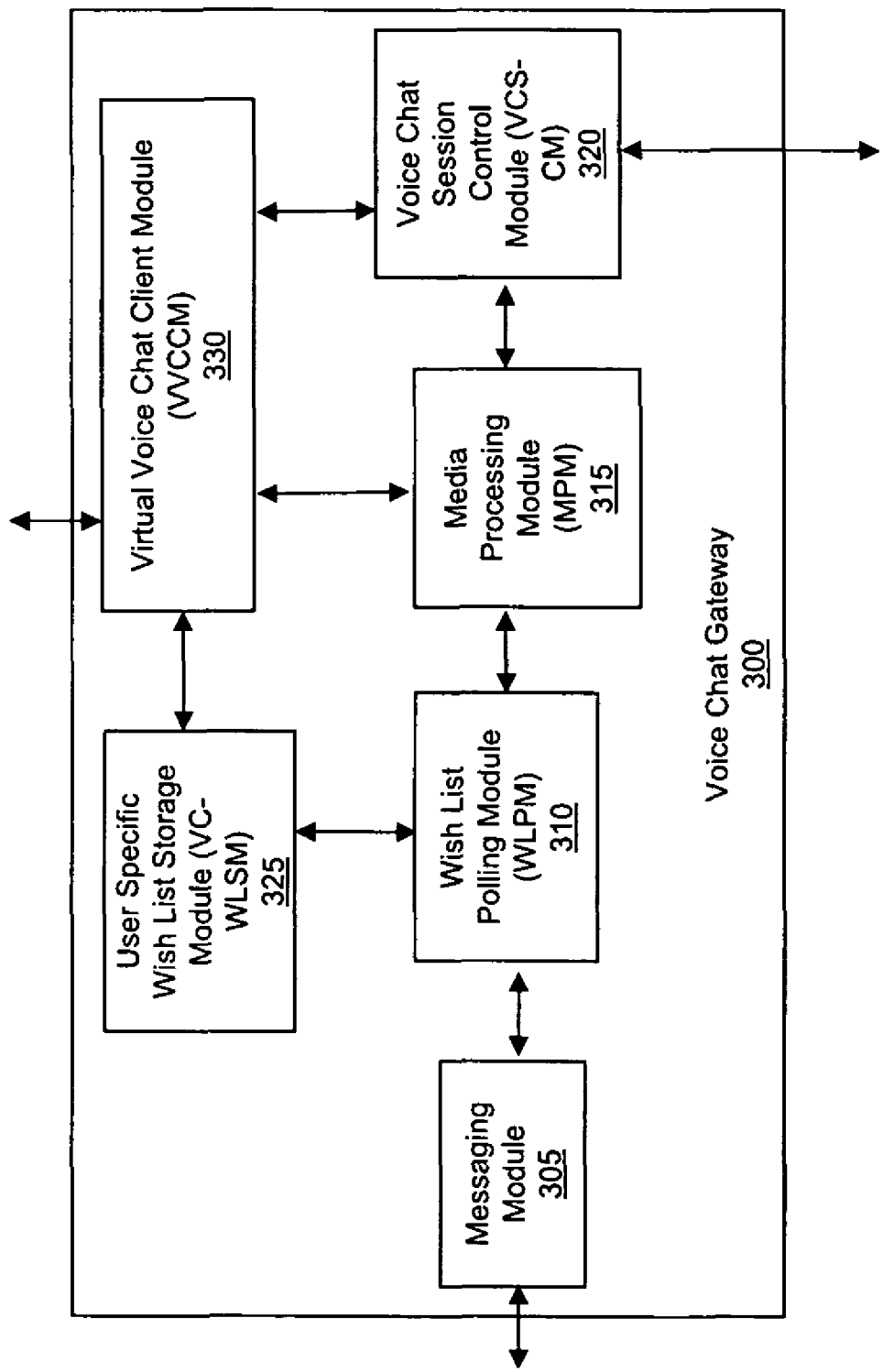
FIG. 3 is a block diagram of an exemplary voice chat gateway in accordance with the present invention.

FIG. 3 is a block diagram of an exemplary voice chat gateway in accordance with the present invention. The various components of the voice chat gateway can be software modules executed on a processor of the gateway and/or can be embodied in an application specific integrated circuit (ASIC). Voice chat gateway 300 includes messaging module 305 which sends SMS messages indicating the availability of users that are listed on other user's wish lists. Module 305 is coupled to wish list polling module 310 which tracks the availability of users listed on other user's wish lists. Media processing module (MPM) 315, which is coupled to wish list polling module 310, processes received voice chat information for transmission to the voice chat called party. The voice chat information can be received from and/or transmitted to voice chat session control module (VCS-CM) 330, which establishes, maintains and clears the chat session. Wish list polling module 310 is also coupled to user specific wish list storage module (VC-WLSM) 325, which stores updated wish list filter information for the user located within the PLMN. Modules 315, 320 and 325 are coupled to virtual voice chat client module (VCCM) 330, which acts as a voice chat client on behalf of mobile station 102. Thus, module 330 makes it appear to communication stations $126_a$ and/or $126_b$ as if mobile station 102 is located on the Internet 120.

Figure 4:
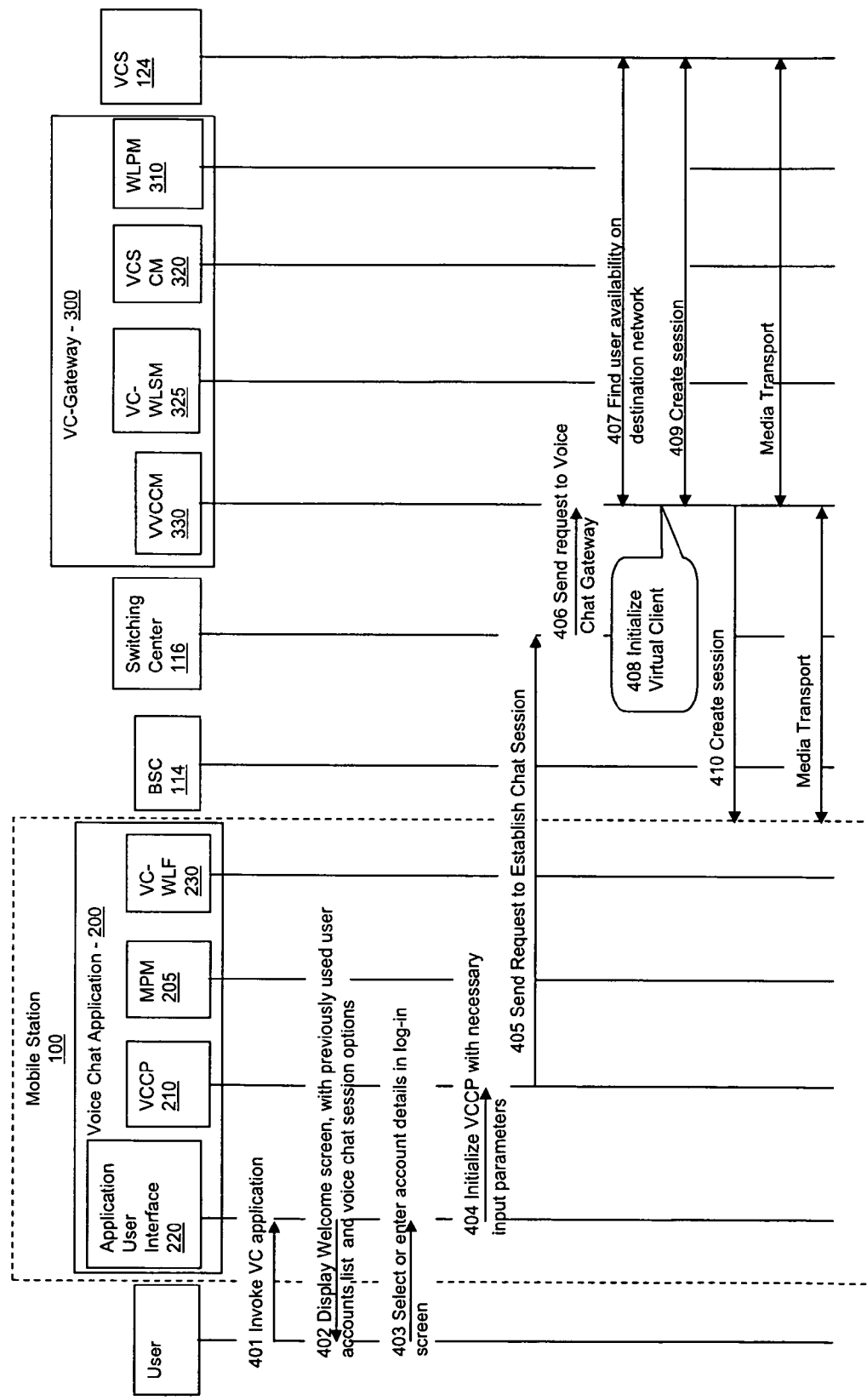
FIGS. 4-7 are exemplary call flow diagrams in accordance with the present invention.

FIGS. 4-7 are exemplary call flow diagrams in accordance with the present invention. Turning now to FIG. 4, initially, when a user invokes the voice chat application (Step 401) application user interface 220 outputs to a display a welcome screen with a list of previously used user accounts and voice chat session options (Step 402). These session options can include, for example, whether the user is online or offline. The user then selects and/or enters the account details in a log-in screen (Step 403) and the user interface 220 initializes the voice chat control protocol module 210 with the necessary input parameters (Step 404). The input parameters include an identifier of the destination communication station, which identifier could be an IP address, medium access control (MAC) address, session initiation protocol (SIP) address, directory number and/or the like.

Voice chat control protocol module 210 sends a request to establish the chat session to switching center 116 (Step 405), which sends the request to virtual voice chat client module 330 of voice chat gateway 300 (Step 406). Virtual voice chat client module 330 attempts to determine the availability of the end user on the destination network via the voice chat server 124, and when the called party is available the virtual client is initialized in the virtual voice chat client module 330 (Steps 407 and 408). Module 330 then creates the voice chat session with the voice chat server 124 (Step 409), and module 330 creates the voice chat session with mobile station 100 (Step 410). As part of the established voice chat session, mobile station 100 exchanges media with module 330, which in turn exchanges the media with voice chat server 124.

Figure 5:
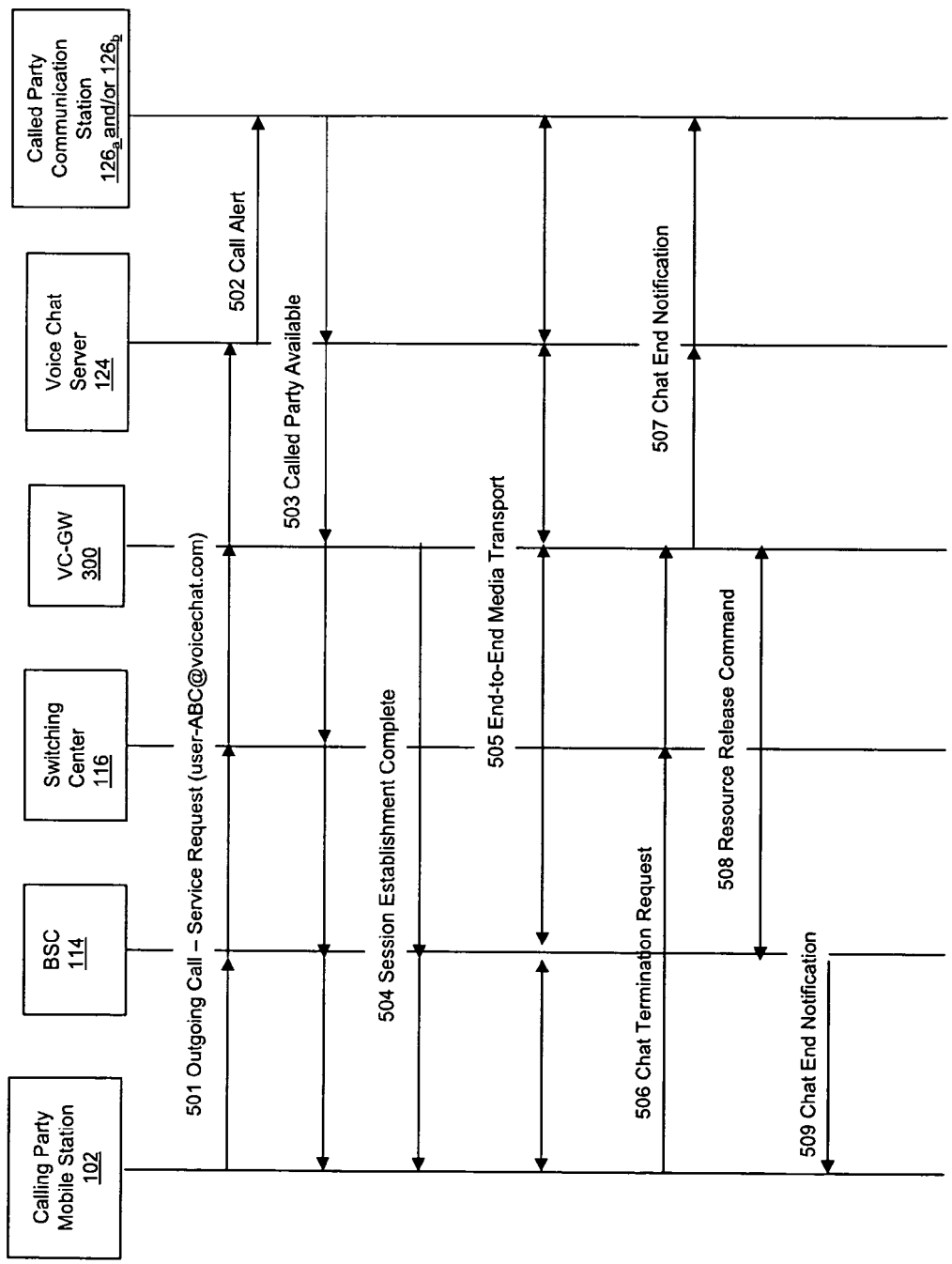

FIG. 5 is a call flow diagram of an exemplary voice chat session establishment procedure between a mobile station 102 and an internet-connected communications station $126_a$ and/or $126_b$. Initially, the calling party's mobile station sends an outgoing call request via base station controller 114, switching center 116, voice chat gateway 300, voice chat server 124 (Step 501). Voice chat server 124 then sends a call alert to the called party communication station $126_a$ and/or $126_b$ (Step 502), and the called party communication station (when available) responds to the call alert indicating such availability, which message is forwarded via elements 124, 300, 116, 114 to the calling party's mobile station 102 (Step 503). Voice chat gateway 300 then sends a session establishment complete message to the calling party mobile station 102 via base station controller 114 (Step 504), and then the calling and called parties can exchange voice chat information (Step 505). As discussed above, the voice chat information from the calling party mobile station 102 is transported in SMS packets via a SMS gateway.

When the calling party decides to terminate the chat session, the calling party's mobile station 102 sends a chat termination request to voice chat gateway 300 via switching center 116 (Step 506). Voice chat gateway 300 sends a chat end notification to the called party communication station $126_a$ and/or $126_b$ (Step 507). Switching center 116 then sends a resource release command to base station controller 114 and voice chat gateway 300 (Step 508), and base station controller 114 sends a chat end notification to calling party's mobile station 102 (Step 509).

Figure 6:
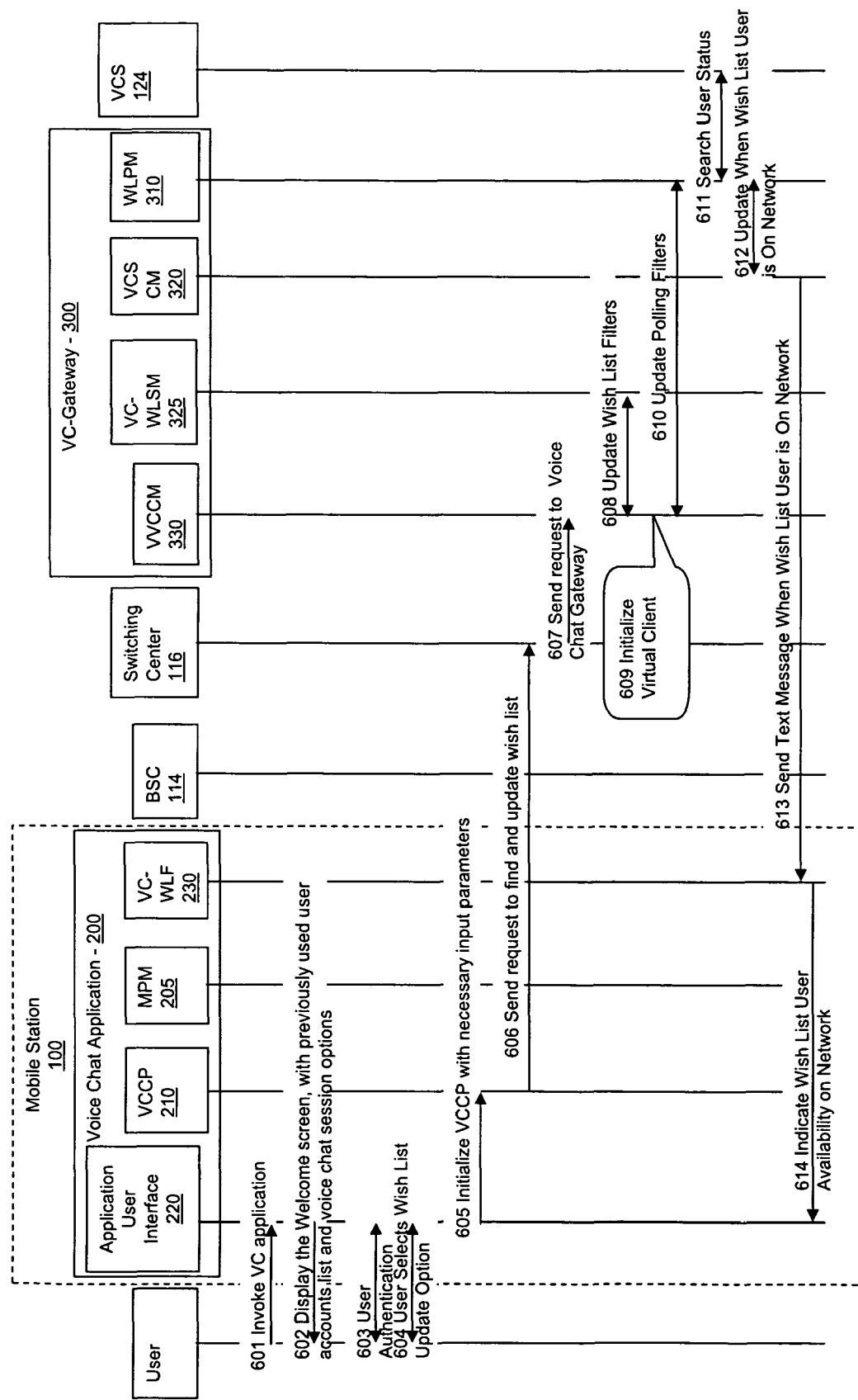

FIG. 6 is a flow diagram of an exemplary voice chat wish list update and notification procedure. Initially, when a user invokes the voice chat application (Step 601) user interface 220 outputs to a display a welcome screen with a list of previously used user accounts and voice chat session options (Step 602). The user then performs authentication via user interface 220 (Step 603) and the user then selects the wish list update option via user interface 220 (Step 604).

User interface 220 then initializes the voice chat control protocol module 210 with the necessary input parameters (Step 605), which then sends the request to switching center 116 to find and update the user's wish list (Step 606). Switching center 116 sends the request to the voice chat gateway (Step 607), which then updates the wish list filters for the user through an exchange of messages between virtual voice chat client module 330 and voice chat wish list storage module 325 (Step 608). Virtual voice chat client module 330 initializes the virtual client (Step 609) and updates the polling filters of wish list polling module 310.

Wish list polling module 310 contacts the virtual chat server 124 to determine the destination wish list user's status (Step 611). When the wish list user is on the network, wish list polling module 310 updates the voice chat session control module 320 (Step 612), which then sends a text message to virtual chat wish list filter 230 of voice chat application 200 when the wish list user is on the network (Step 613). Voice chat wish list filter 230 then sends a message to the user interface 220 to indicate the wish list user availability on the network (Step 614).

Figure 7:
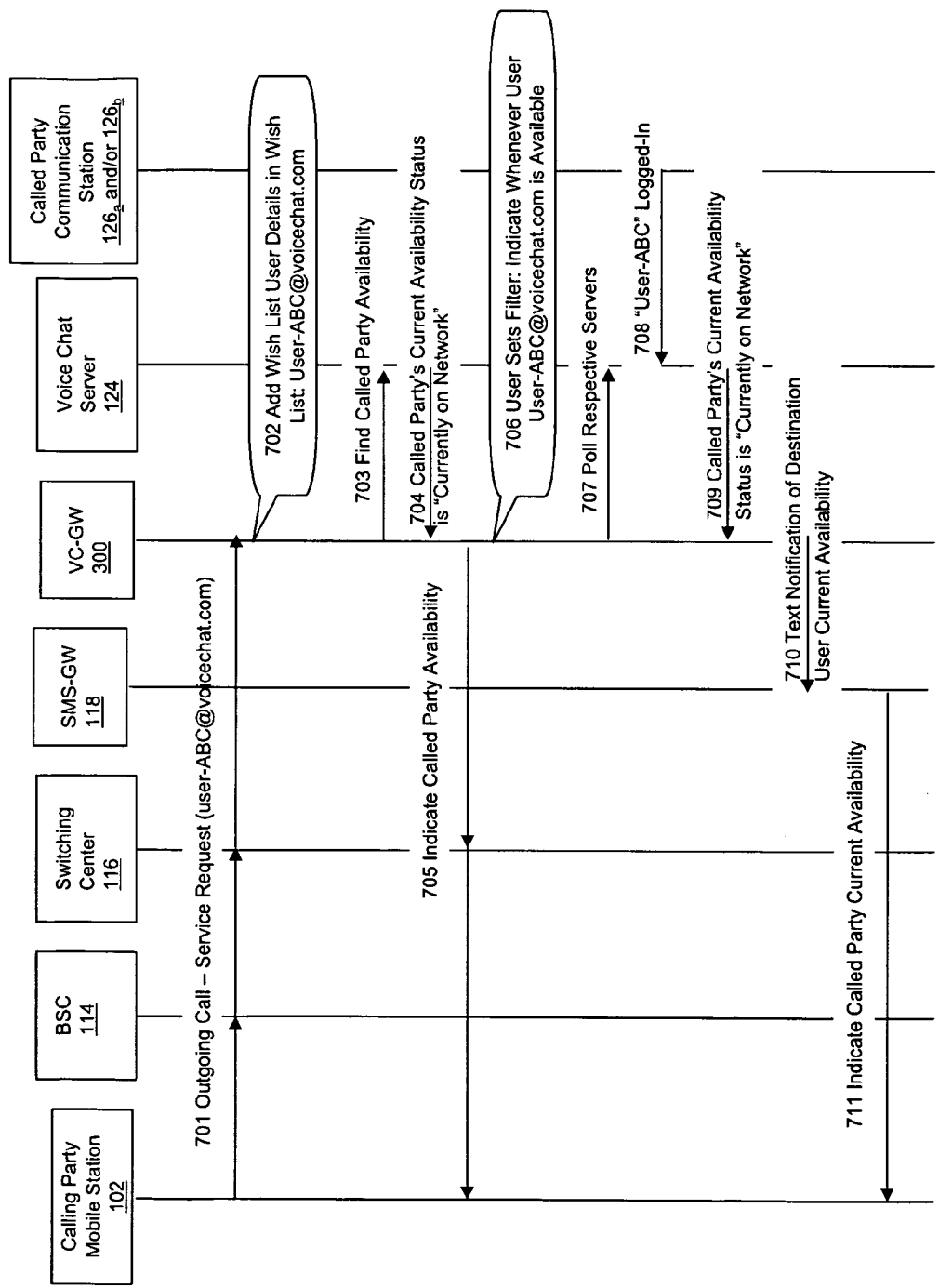

FIG. 7 illustrates an exemplary flow diagram of wish list updates and availability notification procedures in accordance with exemplary embodiments of the present invention. Initially, the calling party's mobile station 102 sends an outgoing call service request to voice chat gateway 300 via base station controller 114 and switching center 116 (Step 701). Voice chat gateway 300 adds the wish list user details in the wish list for the called party mobile station 102 (Step 702) and sends a message to voice chat server 124 to determine the availability of the called party communication station $126_a$ and/or $126_b$ (Step 703).

Voice chat server 124 then indicates that the called party's current availability status is "currently on network" to voice chat gateway 300 (Step 704). Voice chat gateway 300 sends a message indicating the called party's availability to switching center 116, which then sends the message to the calling party's mobile station 102 (Step 705). Subsequently, voice chat gateway 300 sets the filter to indicate whenever the called party's communication station 126$_a$ and/or 126$_b$ is available (Step 706) and voice chat gateway 300 polls the voice chat server 124 (Step 707). When the called party's communication station 126$_a$ and/or 126$_b$ logs-in (Step 708), voice chat server 124 indicates that the called party's current availability status is currently "on network" (Step 709). Voice chat gateway 300 then sends a text notification of the called party's current availability to SMS gateway 118 (Step 710), which then sends a SMS message to the calling party user device to indicate the called party's current availability (Step 711).

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of communicating between a first and second communication station, the method comprising the steps of:
    exchanging voice chat information representing voice packets between the first and second communication stations by way of a short messaging service (SMS) gateway; and
    exchanging media and signaling information, other than the voice chat information, between the first and second communication stations independent of the SMS gateway.

2. The method of claim 1, wherein the voice chat information is provided by the SMS gateway to an Internet gateway, and the signaling information is provided by a switching center of a wireless communication network to the Internet gateway.

3. The method of claim 2, wherein the Internet gateway is a voice chat gateway coupled to a voice chat server.

4. The method of claim 1, wherein the first communication station is supported by a wireless communication network and the second communication station is supported by a wired communication network.

5. A system comprising:
    a short message service (SMS) gateway coupled to a switching center of a wireless communication network;
    an Internet gateway coupled to the SMS gateway; and
    a voice chat server coupled to the Internet gateway, wherein the SMS gateway provides voice chat packets to the voice chat server via the Internet gateway,
    wherein media and signaling information, other than the voice chat packets, is provided to the Internet gateway independent from the SMS gateway.

6. The system of claim 5, wherein the Internet gateway comprises:
    a wish list storage module that stores lists of destination users whose network availability is monitored for at least one originating user; and
    a wish list polling module that polls the voice chat server to determine whether one of the destination users is available.

7. The system of claim 5, wherein the SMS gateway receives voice chat packets from a mobile station, the mobile station comprising a voice chat application.

8. The system of claim 7, wherein the voice chat application includes a media processing module that receives voice information and places the voice information into SMS packets.

9. The system of claim 7, wherein the voice chat application includes a user account module storing information associated with a plurality of voice chat user accounts.

10. The system of claim 7, wherein the voice chat application includes a wish list storing module that stores a list of destination users whose network availability is monitored by the Internet gateway.

* * * * *